United States Patent
Swamy (10) Patent No.: US 11,985,739 B2
(45) Date of Patent: May 14, 2024

(54) LOW LIGHT EXPOSURE CONTROL USING INFRARED LIGHT-EMITTING DIODE ZONES DURING NIGHT VISION

(71) Applicant: Cisco Technology, Inc., San Jose, CA (US)

(72) Inventor: Ramkrishna Swamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 17/898,303

(22) Filed: Aug. 29, 2022

(65) Prior Publication Data

US 2024/0074011 A1 Feb. 29, 2024

(51) Int. Cl.
*H05B 45/12* (2020.01)
*H04N 5/33* (2023.01)
*H04N 23/71* (2023.01)

(52) U.S. Cl.
CPC .............. *H05B 45/12* (2020.01); *H04N 5/33* (2013.01); *H04N 23/71* (2023.01)

(58) Field of Classification Search
CPC ........... H05B 45/12; H04N 5/33; H04N 23/71
See application file for complete search history.

(56) References Cited

U.S. PATENT DOCUMENTS

| | | | | |
|---|---|---|---|---|
| 8,743,226 B2 * | 6/2014 | Lee | .................. | H04N 23/71 |
| | | | | 348/216.1 |
| 10,609,298 B2 * | 3/2020 | Duran | .................. | H04N 23/74 |
| 10,652,477 B2 * | 5/2020 | Yamamoto | .................. | H04N 23/56 |
| 2013/0076927 A1 | 3/2013 | Lee | | |
| 2013/0314544 A1 | 11/2013 | Ban | | |
| 2016/0164261 A1 * | 6/2016 | Warren | .................. | H04N 23/11 |
| | | | | 372/50.122 |
| 2019/0089889 A1 | 3/2019 | Yamamoto | | |
| 2019/0246025 A1 | 8/2019 | Duran et al. | | |
| 2021/0306546 A1 | 9/2021 | Jonsson et al. | | |
| 2022/0217273 A1 * | 7/2022 | Vinahradau | .................. | G08B 13/19632 |

* cited by examiner

*Primary Examiner* — Luong T Nguyen
(74) *Attorney, Agent, or Firm* — Polsinelli P.C.

(57) ABSTRACT

A method is provided for low light exposure control during night vision. The method may include actively illuminating a region by using a plurality of IR LEDs. The IR LEDs are arranged so that an IR LED of the plurality of IR LEDs covers one of a plurality of zones, which combine to cover the region. The method may also include capturing an image frame by an imaging system including an image sensor. The image frame may be made up of pixels and captured using the light originating from the plurality of IR LEDs and reflected from the region onto the image sensor. The method may also include calculating auto-exposure control (AEC) parameters for the image frame to establish an average setting, recalculating AEC parameters for a first zone the plurality of zones and adjusting the power of a first IR LED of the plurality of IR LEDs.

20 Claims, 6 Drawing Sheets

LOW LIGHT EXPOSURE CONTROL USING INFRARED LIGHT-EMITTING DIODE ZONES DURING NIGHT VISION

FIELD

The present application relates to the control of infrared (LR) light-emitting diodes (LEDs) during night mode operations. More particularly, the present application relates to methods for controlling different LED zones.

BACKGROUND

Security cameras are usually mounted in some corners of a building or a room and due to their conspicuous location, the camera may have near objects and far objects in the field of view (FOV). IR LEDs can be used to illuminate the objects during night mode operations or night vision.

However, the conventional environmental setup may not work well when an active illumination using IR LEDs is used during night mode operations. The basis of night mode operations is the amount of perceivable light hitting the image sensor. In the absence of visible light in the night mode operations, the scene can be actively illuminated with infrared (IR) light using IR LEDs. The more infrared power pumped into the scene, the more reflected light from the scene can be sensed by the image sensor in the cameras, which may improve the signal-to-noise ratio (SNR) and get an appealing or usable image of the scene. However, if the objects are nearby, then a strong reflection may throw off the exposure control (AEC) and render the video/image unusable.

BRIEF DESCRIPTION OF THE DRAWINGS

To describe how the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment, and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained utilizing the instruments and combinations particularly pointed out in the appended claims. These and other features of the disclosure will become more fully apparent from the following description and appended claims or can be learned by the practice of the principles set forth herein.

Overview

In one aspect, a method is provided for low light exposure control during night vision. The method may include actively illuminating a region by using a plurality of IR LEDs. The IR LEDs are arranged so that an IR LED of the plurality of IR LEDs covers one of a plurality of zones, and the plurality of zones combine to cover the region. The method may also include capturing an image frame by an imaging system including an image sensor. The image frame may be made up of pixels and captured using the light originating from the plurality of IR LEDs and reflected from the region onto the image sensor. The method may also include calculating auto-exposure control (AEC) parameters for the image frame to establish an average setting. The method may also include recalculating AEC parameters for a first zone the plurality of zones. The method may further include adjusting the power of a first IR LED of the plurality of IR LEDs when the AEC parameters for a first zone indicate that an image portion from the first zones is over-exposed or under-exposed relative to the average settings for the image frame, the first IR LED covers the first zone.

In another aspect, a non-transitory computer-readable medium including instructions, the instructions, when executed by a computing system, cause the computing system to actively illuminate a region by using a plurality of IR LEDs. The IR LEDs are arranged so that an IR LED of the plurality of IR LEDs covers one of a plurality of zones. The non-transitory computer-readable medium including instructions, the instructions, when executed by a computing system, cause the computing system to capture an image frame by an imaging system including an image sensor. The image frame may be made up of pixels and captured using the light originating from the plurality of IR LEDs and reflected from the region onto the image sensor. The non-transitory computer-readable medium including instructions, the instructions, when executed by a computing system, cause the computing system to calculate auto-exposure control (AEC) parameters for the image frame to establish an average setting. The non-transitory computer-readable medium including instructions, the instructions, when executed by a computing system, cause the computing system to recalculate AEC parameters for a first zone the plurality of zones. The non-transitory computer-readable medium including instructions, the instructions, when executed by a computing system, cause the computing system to adjust the power of a first IR LED of the plurality of IR LEDs when the AEC parameters for a first zone indicate that an image portion from the first zones is over-exposed or under-exposed relative to the average settings for the image frame.

In a further aspect, a system may include one or more processors. The system may also include at least one computer-readable storage medium having stored therein instructions which, when executed by the one or more processors, cause the system to actively illuminate a region by using a plurality of IR LEDs. The IR LEDs are arranged so that an IR LED of the plurality of LR LEDs covers one of a plurality of zones. The at least one computer-readable storage medium having stored therein instructions which, when executed by the one or more processors, cause the system to capture an image frame by an imaging system including an image sensor, the image frame be made up of pixels and captured using the light originating from the plurality of IR LEDs and reflected from the region onto the image sensor. The at least one computer-readable storage medium having stored therein instructions which, when executed by the one or more processors, cause the system to calculate auto-exposure control (AEC) parameters for the image frame to establish an average setting. The at least one computer-readable storage medium having stored therein instructions which, when executed by the one or more processors, cause the system to recalculate AEC parameters for a first zone the plurality of zones. The at least one computer-readable storage medium having stored therein instructions which, when executed by the one or more processors, cause the system to adjust the power of a first IR LED of the plurality of IR LEDs when the AEC parameters for a first zone indicate that an image portion from the first zones is over-exposed or under-exposed relative to the average settings for the image frame.

Example Embodiments

Security cameras may have near and far objects in a scene because of the way the security cameras are deployed. The near and far objects combined with active lighting during night vision may skew the image of the scene and render the image unusable. For example, the scene's average lighting response is used to set the image brightness, which means that bright reflective spots can skew the average lighting, thereby yielding a suboptimal calculation for setting the scene brightness.

The present technology addresses the need in the art for better control of IR light exposure during night mode operations.

The present technology provides active lighting by using a set of infrared (IR) LEDs, which typically have overlapping radiation fields. Therefore, the overall power may include overlapped power from different IR LEDs. Sometimes, there may be two fields of view, depending on whether the camera has zoom functions. For example, the camera may have zoom-in and zoom-out functions associated with two fields of view. Regardless of the zoom functions, the center of power is directed towards the center of the image.

The present technology involves at least two aspects. First, the center of power may be shifted away from the center of the image, for example, by physically tilting the IR LEDs or using a second optical lens to change the direction of light from the LEDs. Second, the auto-exposure control (AEC) is cycled region by region, which corresponds to each respective LED zone.

The present technology also controls the active lighting into non-overlapped zones and also controls the exposure of different regions of the scene in sequence to optimize the whole image response. If the control is done this way, hot or dark spots can be mitigated during active lighting scenarios such that customers would not have to worry about camera placement during mass deployment.

Figure 1A:
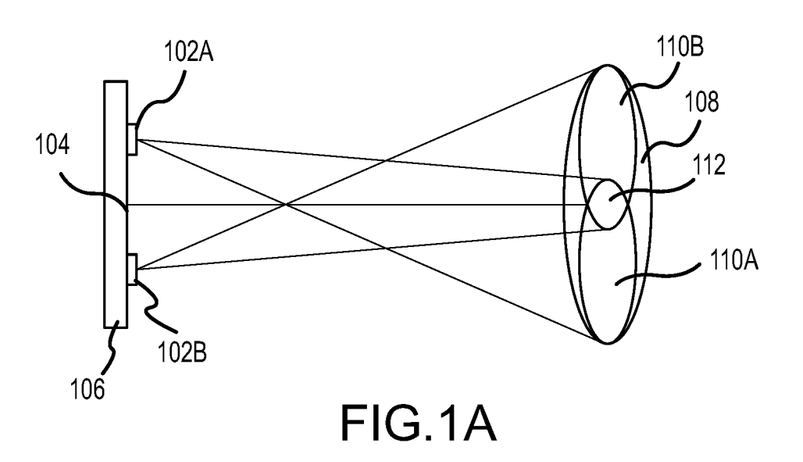
FIG. 1A depicts a side view of an experimental setup including IR LEDs for illuminating a region in accordance with some aspects of the disclosed technology.
Figure 1B:
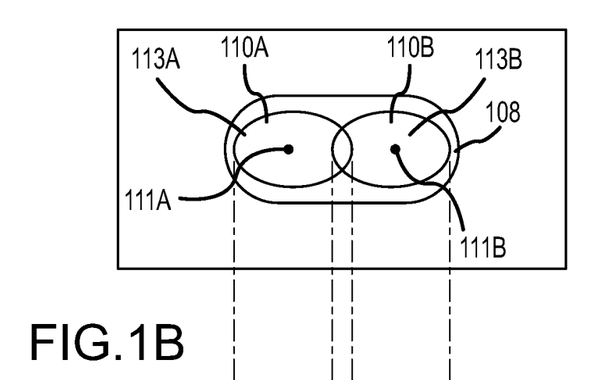
FIG. 1B depicts a front view of an image including an overlapping area between two zones of FIG. 1A in accordance with some aspects of the disclosed technology.

FIG. 1A is a side view of an experimental setup including IR LEDs for illuminating a region in accordance with some aspects of the disclosed technology. FIG. 1B is a front view of an image including an overlapping area between two zones of FIG. 1A in accordance, with some aspects of the disclosed technology. As illustrated in FIG. 1A, first and second IR LEDs 102A and 102B are mounted on a base 106.

A camera including an image sensor in a center 104 may capture the reflected light from the objects in region 108. The two IR LEDs 102A and 102B are tilted such that the first LED 102A illustrates a first zone 110A, while the second LED 102B illustrates a second zone 110B. A region 108 may be covered by the first and second LED zones 110A and 110B, which may have an overlapping area 112, as shown in FIGS. 1A and 1B.

Compared to a large region 108 of a scene, the two zones 110A and 110B may improve power efficiency for illuminating the scene. In some variations, two or more zones may have different combinations of power for the LEDs and improve power efficiency for illuminating the scene.

Figure 1C:
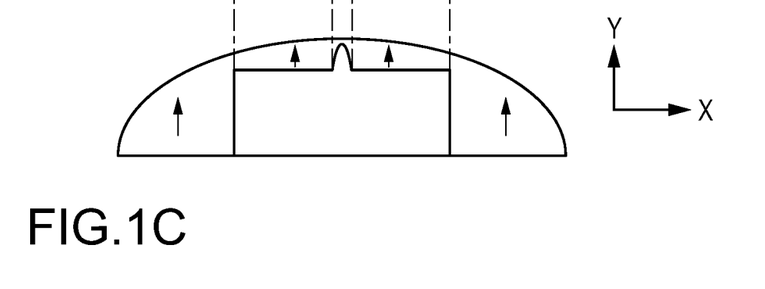
FIG. 1C illustrates light brightness distribution along an X-axis in accordance with some aspects of the disclosed technology.

FIG. 1C illustrates light brightness distribution along an X-axis in accordance with some aspects of the disclosed technology. As illustrated in FIG. 1C, the X-axis represents the distance across the zones from the left side to the right side, while the brightness represented along a Y-axis varies with the distance. In overlapping area 112, the brightness is the highest. Within the first and second zones 110A and 110B, the brightness is lower. Outside the first and second zones 110A and 1101B, the brightness is the lowest. To obtain balanced lighting, the power of the first and second LEDs may be increased to match the brightness in the overlapping area 112. Note that the centers 111A and 111B of the first and second zones 110A and 110B may have higher brightness than the edges 113A and 113B of the first and second zones.

The power of each LED may be adjusted differently. For example, the power of the first LED associated with the first LED zone may be increased to the level of the overlapping area. The power of the second LED associated with the second LED zone may also be increased to the level of the overlapping area. As such, the region may have a more uniform power distribution, which allows having better images.

The positions of the LEDs or the number of LEDs may be arranged to cover the region 108 with a number of LED zones, which may have overlapping areas.

The lights from LEDs can be tilted in many ways, mechanically on PCB, in-module, or even with a second optical lens.

Figure 2:
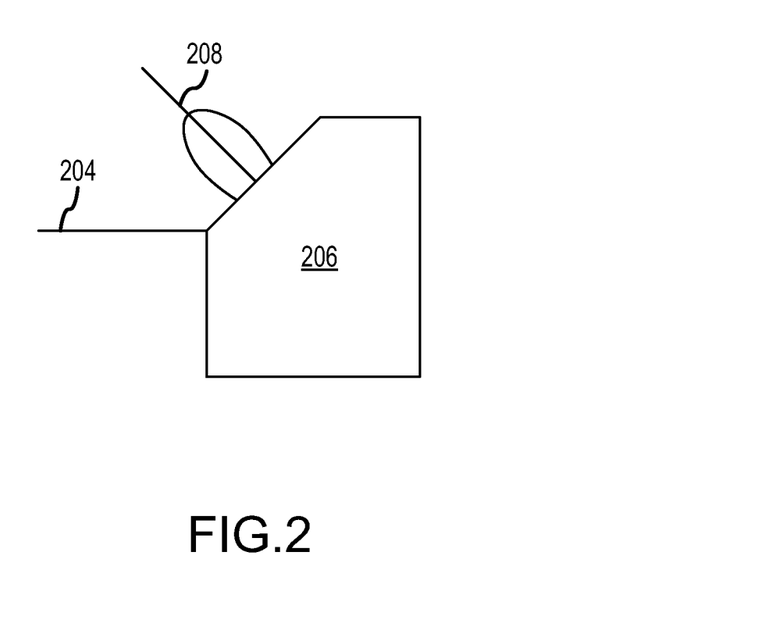
FIG. 2 depicts an LED mounted on a base with a tilt angle to shift the light away from the center in accordance with some aspects of the disclosed technology.

FIG. 2 depicts an LED mounted on a base with a tilt angle to shift the light away from the center in accordance with some aspects of the disclosed technology. As shown, an LED 202 is mounted on a base 206 with a tilt angle 208 from a normal direction 204. The tilt angle may vary from 5° to 80° to shift the light away from the center or normal direction 204.

In some variations, the base 206 may be attached to a motor such that the tilt angle may vary dynamically. This dynamic adjustment can be helpful in the case of non-overlapping areas from the LED zones created from a number of LEDs. To increase the lighting in the non-overlapping area, the power of some LEDs may be increased to expand the size of the LED zone. Alternatively, the LEDs may be tilted to a different angle.

The cost of manufacture is relatively low when a number of LEDs are mounted on a base without motor. The cost of manufacture increases when an LED can be dynamically adjusted to shift light by using a motor.

Figure 3:
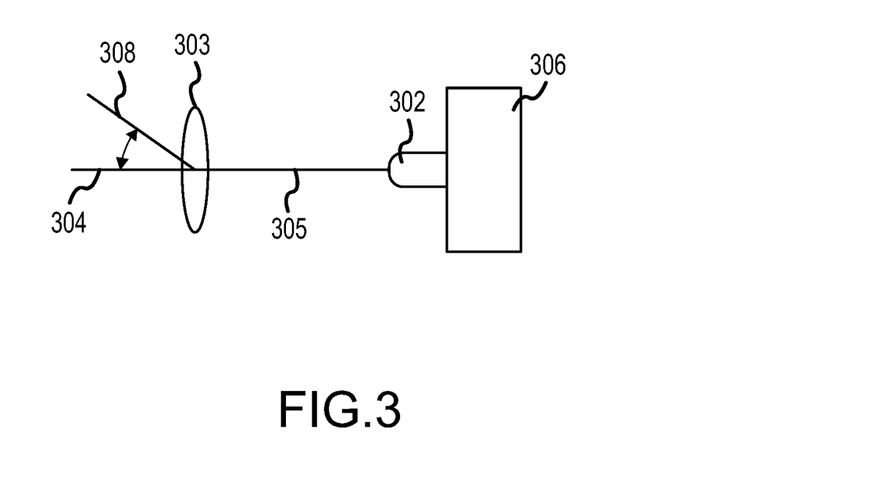
FIG. 3 depicts an optical lens placed in front of an LED to shift the light away from the center in accordance with some aspects of the disclosed technology.

FIG. 3 depicts an optical lens placed in front of an LED to shift the light away from the center in accordance with some aspects of the disclosed technology. As illustrated, an optical lens 303 is added to the front of an LED 302 mounted on a base 306 without any tilt angle. The optical lens can shift the light 305 away from a normal direction or center 304 to be along direction 308 with a tilt angle from the normal direction.

Each of the LEDs may have a different tilt angle. One setup of LEDs is illustrated below. Each LED has a LED zone. The different LED zones from the LEDs may be combined to cover the region of interest.

Figure 4:
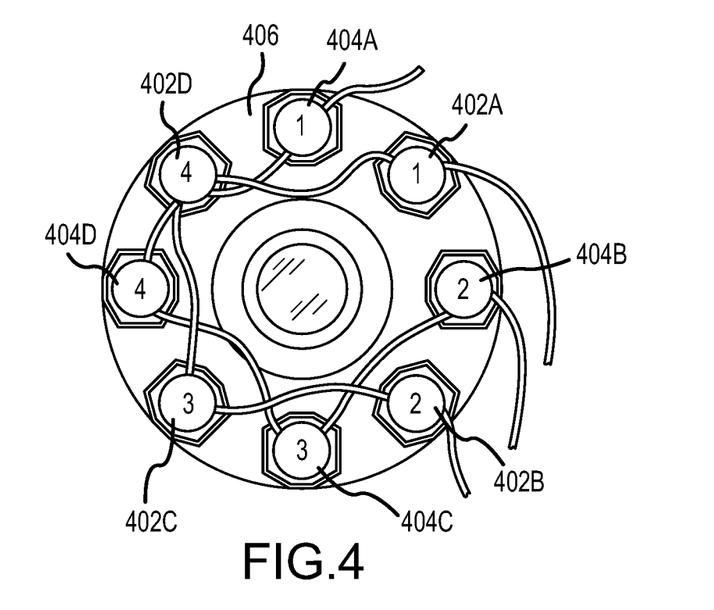
FIG. 4 depicts eight LEDs mounted on a base having different tilt angles to shift the light away from the center in accordance with some aspects of the disclosed technology.

FIG. 4 depicts eight LEDs mounted on a base having different tilt angles to shift the light away from the center in accordance with some aspects of the disclosed technology. As illustrated in FIG. 4, the first set of four LEDs 402A-D, and the second set of four LEDs 402A-D are mounted with different tilt angles on a base 406. The first set of LEDs and the second set of LEDs are arranged with each LED from the first set being neighbored by two LEDs from the second set. All the LEDs are spaced equally along a circumference. The first set of LEDs may have a different tilt angle from the second set of LEDs.

It will be appreciated by those skilled in the art that the arrangement of the LEDs, the number of the LEDs, and tilt angles of the LEDs may vary to cover a region for a particular application. The region will be covered by a number of LED zones created by a number of LEDs.

Figure 5:
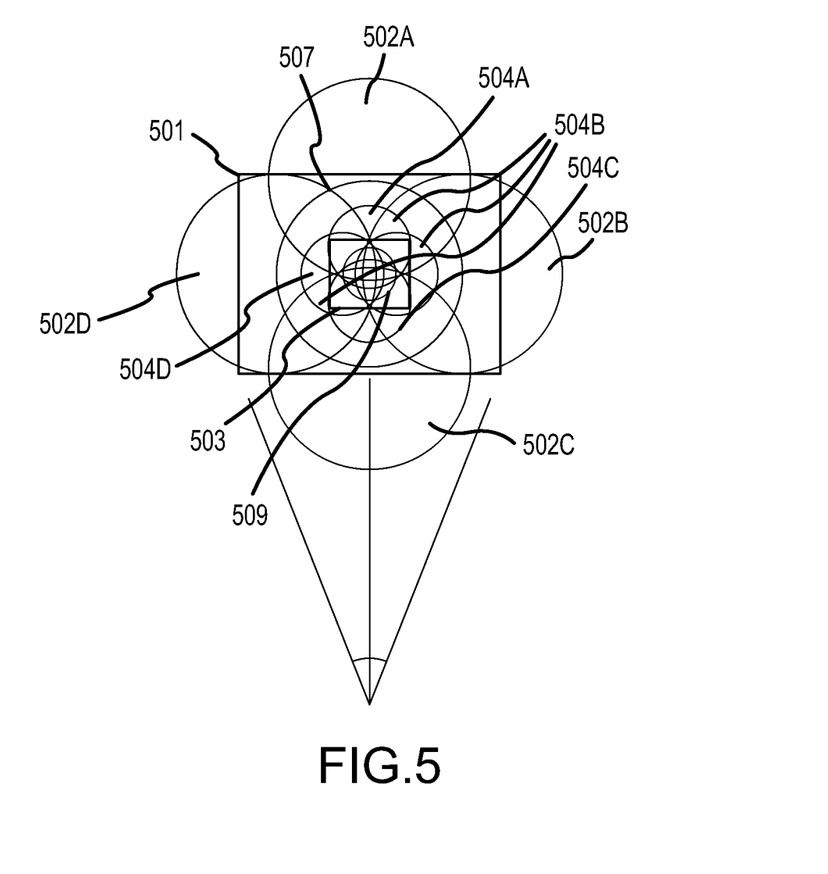
FIG. 5 depicts an image of a zoom-in and a zoom-out field of view in accordance with some aspects of the disclosed technology.

FIG. 5 depicts an image of a zoom-in and a zoom-out field of view in accordance with some aspects of the disclosed technology. As illustrated in FIG. 5, a large rectangle 501 is an image of the field of view (FOV) when a camera is operated in a zoom-in mode. A small rectangle 503 is an image of FOV when the camera is operated in a zoom-out mode. The large rectangle 501 represents a large region in a wide field of view or a wide view, while the small rectangle 503 represents a small region in a narrow field of view or a tele view.

The large region 501 in a wide field of view (e.g. a camera may have a zoon-in function) may be covered by four LED zones 502A-D represented by large circles, which are formed by the four LEDs 402A-D. The small region 503 in a narrow field of view or a tele view (e.g. the camera may have a zoom-out function) may be covered by four LED zones 504A-D represented by small circles, which are formed by the four LEDs 404A-Ds.

In a zoom-in mode, the four LED zones 502A-D have some overlapping areas in a large circle 507, which is within the large rectangle 501. The large circle 507 represents a single zone created by one LED in the center by a conventional approach. The single-zone 507 is covered by four LED zones 502A-D according to the present technology.

In a zoom-out mode, the four LED zones 504A-D have some overlapping areas in a small circle 509, which is within the small rectangle 503. The small circle 509 represents a single zone created by one LED in the center. The single-zone 509 is covered by four LED zones 504A-D according to the present technology.

The overlapping area may look brighter than the non-overlapping areas. The overlapped area may be identified. Then, the brightness of the non-overlapping areas may be changed to be similar to that of the overlapped area.

With the disclosed low light exposure control during night vision, the distance between the image sensor of a camera and the scene may be large, for example, ranging from 0.1 meters to 100 meters.

Figure 6:
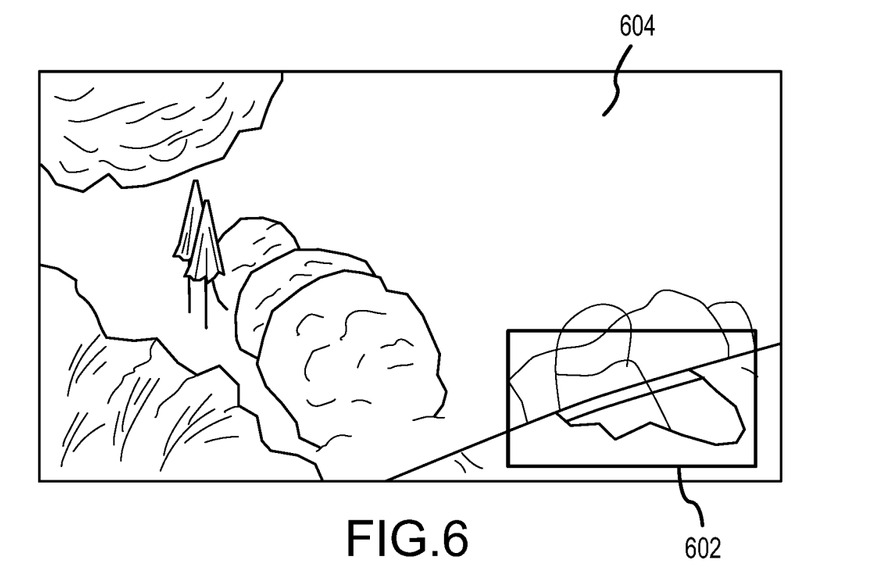
FIG. 6 is an image including a zone for auto-exposure control (AEC) calculation in accordance with some aspects of the disclosed technology.

FIG. 6 is an image including a zone for auto-exposure control (AEC) calculation in accordance with some aspects of the disclosed technology. As illustrated in FIG. 6, an image 604 of an entire region is taken. Also, an image is taken for each zone or box 602 of a region when only one LED is turned on. The box 602 can move to other portions of the image 604 to cover the entire region. Each zone or box 602 is associated with a different LED which has its power controlled independently from other LEDs.

Figure 7:
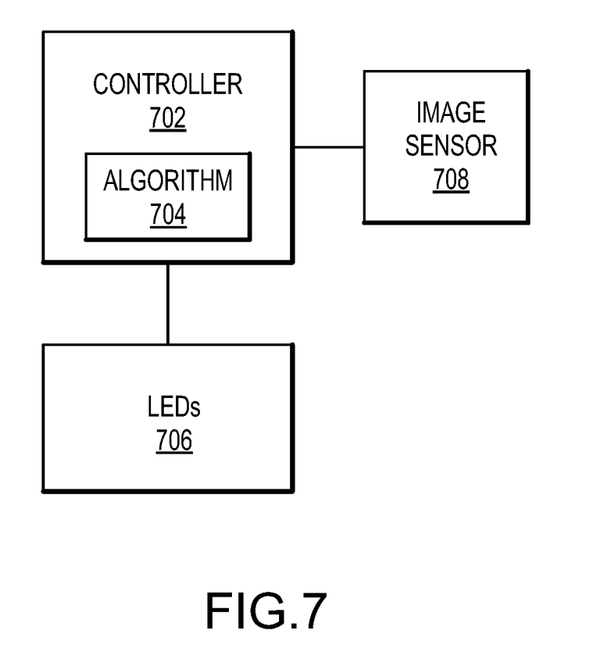
FIG. 7 illustrates a system diagram including a controller for AEC in accordance with some aspects of the disclosed technology.

FIG. 7 illustrates a system diagram including a controller for AEC in accordance with some aspects of the disclosed technology. As illustrated, a controller 702 includes an algorithm 704 for control LEDs 706. The controller 702 receives data (e.g., intensity distribution for an image frame made of pixels.) from an image sensor 708, which captures images of a region of a target or images of different zones that cover the region.

The controller 702 does normal framewise AEC calculations based on the image of region 604, as illustrated in FIG. 6. Then, based on the image captured for each zone 602, as illustrated in FIG. 6, controller 702 recalculates AEC parameters for each zone 602. The auto-exposure control (AEC) algorithm is known in most image signal processors (ISPs). The core calculation remains the same.

The algorithm 704 may include: (1) Do normal framewise AEC calculation to obtain an average setting. The algorithm 704 may include: (2) Then for each region or each LED zone, recalculate AEC parameters. Based on the recalculation, the algorithm adjusts the IR intensity from the average setting for this region or LED one with a decrement or an increment in IR intensity. For instance, if the region is bright, the LED intensity would be reduced. The AEC cycles through the LED zones to further optimize the IR intensities in the regions of interest. The algorithm 704 may include: (3) Run steps 1-2 again after some timeout to prevent constant lighting changes.

If done this way, hot spots or dark spots may not be a concern during active lighting scenarios or during a massive deployment of LEDs. Also, latency is not a concern for security cameras. Hence, the AEC can take some time to converge on the solution.

The present technology can also be used for LEDs having IR wavelengths and visible wavelengths in an integrated product. The present technology can also be used for an external illuminator having visible light or IR light with connecting signals for the different regions or object areas for the AEC algorithm to process.

Figure 8:
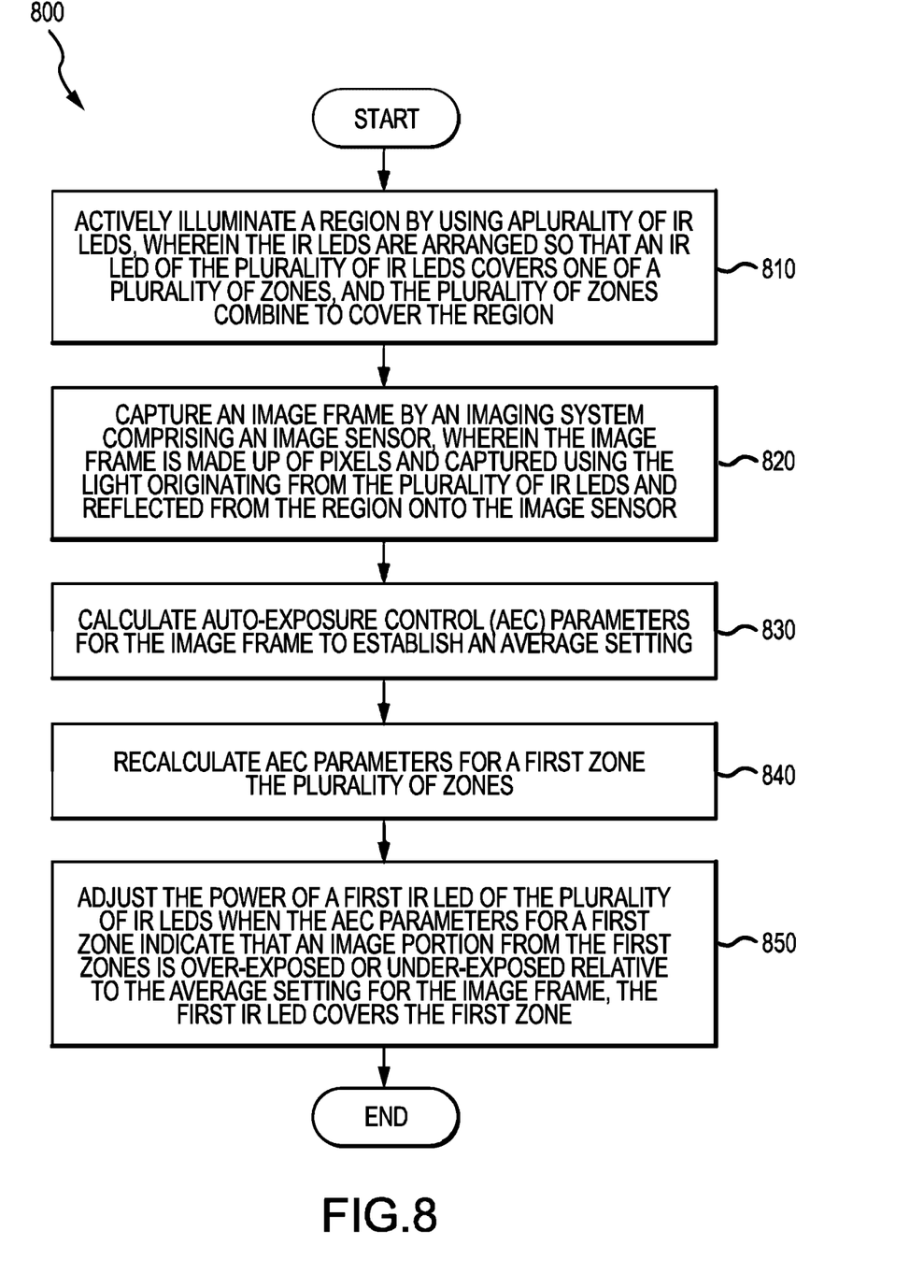
FIG. 8 is a flow chart illustrating the steps of low light exposure control during night vision in accordance with some aspects of the disclosed technology.

FIG. 8 illustrates an example method 800 for low light exposure control during night vision in accordance with some aspects of the disclosed technology. Although the example method 800 depicts a particular sequence of operations, the sequence may be altered without departing from the scope of the present disclosure. For example, some of the operations depicted may be performed in parallel or in a different sequence that does not materially affect the function of method 800. In other examples, different components of an example device or system that implements method 800 may perform functions at substantially the same time or in a specific sequence.

According to some examples, method 800 may include actively illuminating a region at block 810. For example, the LEDs 706 illustrated in FIG. 7 may actively illuminate a region. The LEDs may be IR LEDs. The IR LEDs are arranged so that an IR LED of the plurality of IR LEDs covers one of a plurality of zones.

In some variations, the imaging system is a camera that may have a first operation mode of zoom-in and a second operation mode of zoom-out.

In some variations, one of the plurality of zones may overlap with another one of the plurality of zones.

In some variations, the plurality of zones is a plurality of fields of view.

In some variations, method 800 may also include mounting the plurality of LEDs on a base to tilt the plurality of LEDs at two or more tilt angles from the base to shift one of the plurality of zones from another of the plurality of zones.

In some variations, a smaller shift results in a narrower field of view.

In some variations, a larger shift results in a broader field of view.

In some variations, the plurality of zones may be created by adding a plurality of lenses in front of the plurality of LEDs that are mounted on a base without tilting. The plurality of lenses may be configured to direct the IR lights from the plurality of LEDs into the plurality of zones.

In some variations, one or more of the plurality of zones may be dynamically created by mechanically adjusting the positions of the one or more of the plurality of lenses using one or more motors.

According to some examples, method 800 may include capturing an image frame by an imaging system comprising an image sensor at block 820. For example, the image sensor 708 illustrated in FIG. 7 may capture an image frame by an imaging system comprising an image sensor. For example, the image frame may be made up of pixels and captured using the light originating from the plurality of IR LEDs and reflected from the region onto the image sensor.

According to some examples, method 800 may include calculating auto-exposure control (AEC) parameters for the image frame to establish an average setting at block 830. For example, algorithm 704 illustrated in FIG. 7 may calculate auto-exposure control (AEC) parameters for the image frame to establish an average setting. The image frame includes a plurality of zones.

According to some examples, method 800 may also include recalculating AEC parameters for a first zone the plurality of zones at block 840. For example, algorithm 704 illustrated in FIG. 7 may recalculate AEC parameters for a first zone the plurality of zones.

In some variations, recalculating AEC parameters may be done sequentially.

In some variations, adjusting the power of each of the LEDs based on the calculated parameters may be done sequentially.

In some variations, recalculating AEC parameters may be done in parallel with other zones.

In some variations, adjusting the power of each of the LEDs based on the calculated parameters may be done in parallel with other zones.

According to some examples, method 800 may include adjusting the power of a first IR LED of the plurality of IR LEDs when the AEC parameters for a first zone indicates that an image portion from the first zones is over-exposed or under-exposed relative to the average settings for the image frame at block 850. For example, controller 702 illustrated in FIG. 7 may adjust the power of a first IR LED of the plurality of IR LEDs when the AEC parameters for a first zone indicate that an image portion from the first zones is over-exposed or under-exposed relative to the average settings for the image frame.

In some variations, method 800 may also include adjusting at least one second IR LED that illuminates at least one-second zone. For example, controller 702 illustrated in FIG. 7 may adjust the power of the at least one second IR LED when the AEC parameters for a second zone indicates that an image portion from the second zones is over-exposed or under-exposed relative to the average settings for the image frame.

In some variations, adjusting the power of a first IR LED of the plurality of IR LEDs may include identifying an overlapping region between two neighboring zones; and increasing the power of each of the two neighboring zones to match the power in the overlapped region.

In some variations, method 800 may also include comprising repeating calculating auto-exposure control (AEC) parameters for the image frame to establish an average setting, wherein the image frame includes the plurality of zones and recalculating AEC parameters for a first zone the plurality of zones after a period of timeout.

EXAMPLES

Experiments for tilted LEDs as illustrated in FIG. 4 and image testing are provided below. The LEDs may be OPS LTE-R38386A-K-CS, LTE-R38386M-GE3 LEDs from LIT-EON. The experiments and conditions are provided as follows. The camera setting included a shutter speed of 1/30 and a gain of 16 times.

For the tele view, four GE3 LEDs (e.g. LTE-R38386M-GE3) had a FOV of 20° with a 7° tilt angle. A small tilt angle results in a narrower field of view. The LEDs had a power of 6.5 V with a current of 500 mA.

For the wide view, four A-K LEDs (e.g. LTE-R38386A-K-CS) had a FOV of 500 with a 210 tilt angle. The LEDs had a power of 8.4 V with a current of 1 A. The testing distance were 10 meters, 50 meters, and 100 meters.

Table 1 shows that all LEDs were turned on to get an average setting. When all LEDs were turned on, an image of a scene, a target, or a region was captured to get an average setting.

Table 1 also shows that each of the four A-K LEDs of the first group or the four GE3 LEDs of the second group was turned on sequentially, i.e. only one LED was turned on. An image of the scene, target, or region was taken when only one LED was on. Then, algorithm 704 does the recalculation of AEC parameters and adjusts the IR intensity of the only LED which was on.

TABLE 1

| | Wide View | Tele View |
| --- | --- | --- |
| LED off | All LEDs off | All LEDs off |
| 1$^{st}$ group LEDs A-K or 2$^{nd}$ group LEDs GE3 | All LEDs turn-on | All LEDs turn-on |
| | 1$^{st}$ position LED turn-on only | 1$^{st}$ position LED turn-on only |
| | 2$^{nd}$ position LED turn-on only | 1$^{st}$ position LED turn-on only |
| | 3$^{rd}$ position LED turn-on only | 3$^{rd}$ position LED turn-on only |
| | 4$^{th}$ position LED turn-on only | 4$^{th}$ position LED turn-on only |

Figure 9:
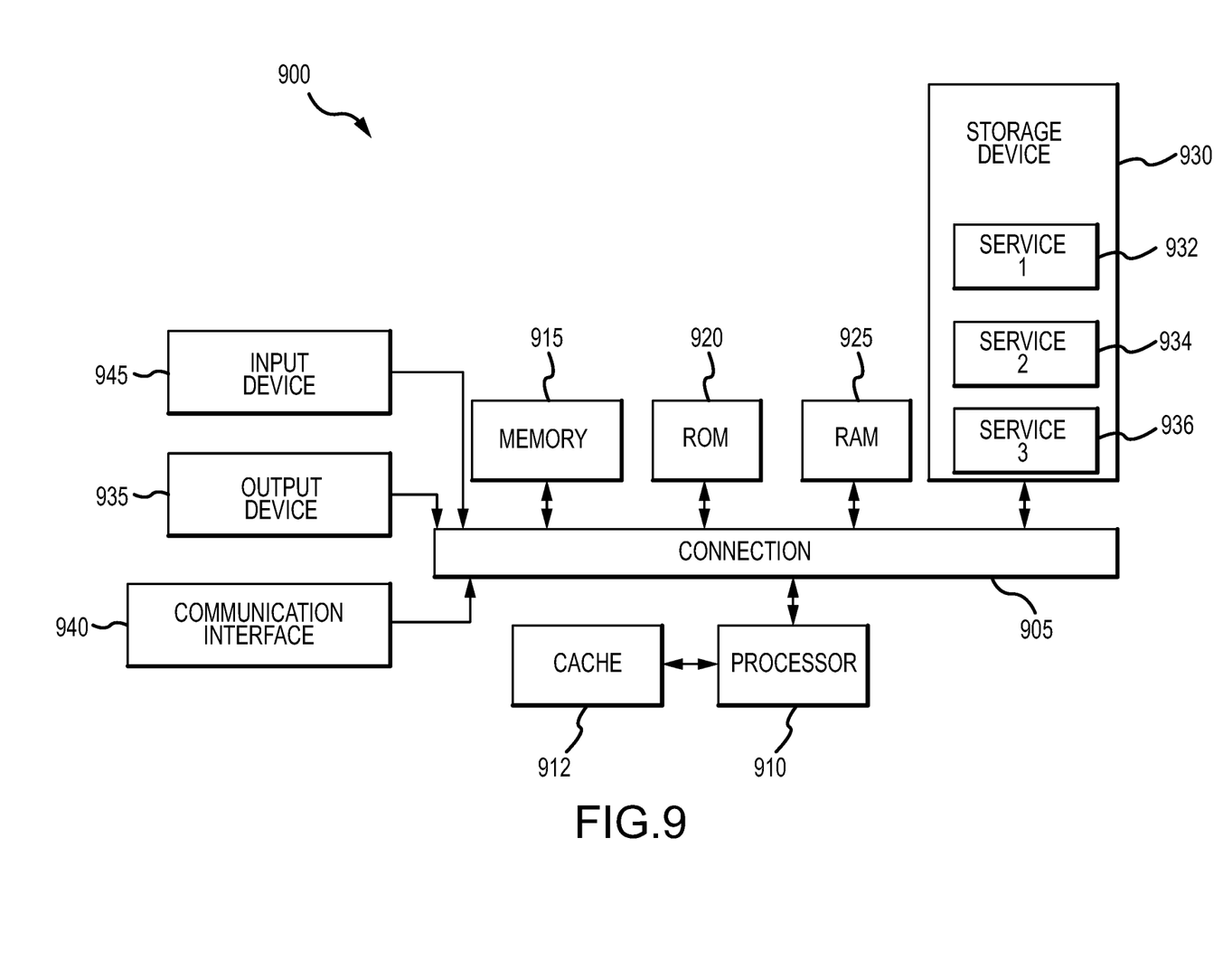
FIG. 9 shows an example of a computing system in accordance with some aspects of the disclosed technology.

FIG. 9 shows an example of computing system 900, which can be for example any computing device making up any of the entities illustrated in FIG. 7, for example, controller 702, or any component thereof in which the components of the system are in communication with each other using connection 905. Connection 905 can be a physical connection via a bus, or a direct connection into processor 910, such as in a chipset architecture. Connection 905 can also be a virtual, networked connection, or logical connection.

In some embodiments, computing system 900 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

An example system 900 includes at least one processing unit (CPU or processor) 910 and connection 905 that couples various system components including system memory 915, such as read-only memory (ROM) 920 and random-access memory (RAM) 925 to processor 910. Computing system 900 can include a cache of high-speed memory 912 connected directly with, close to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of many output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for low light exposure control during night vision, the method including: actively illuminating a region by using a plurality of IR LEDs, wherein the IR LEDs are arranged so that an IR LED of the plurality of IR LEDs covers one of a plurality of zones, the plurality of zones combine to cover the region; capturing an image frame by an imaging system including an image sensor, the image frame being made up of pixels and captured using the light originating from the plurality of IR LEDs and reflected from the region onto the image sensor; calculating auto-exposure control (AEC) parameters for the image frame to establish an average setting; recalculating AEC parameters for a first zone the plurality of zones; and adjusting the power of a first IR LED of the plurality of IR LEDs when the AEC parameters for a first zone indicates that an image portion from the first zones is over-exposed or under-exposed relative to the average settings for the image frame, the first IR LED covers the first zone.

Aspect 2. The method of Aspect 1, wherein one of the plurality of zones overlaps with another one of the plurality of zones.

Aspect 3. The method of any of Aspects 1 to 2, further includes adjusting at least one second IR LED that illuminates at least one-second zone.

Aspect 4. The method of any of Aspects 1 to 3, further includes mounting the plurality of LEDs on a base to tilt the plurality of LEDs at two or more tilt angles from the base to shift one of the plurality of zones from another of the plurality of zones.

Aspect 5. The method of any of Aspects 1 to 4, wherein a smaller shift results in a narrower field of view.

Aspect 6. The method of any of Aspects 1 to 5, wherein a larger shift results in a broader field of view.

Aspect 7. The method of any of Aspects 1 to 6, wherein the plurality of zones is created by adding a plurality of lenses in front of the plurality of LEDs that are mounted on a base without tilting, the plurality of lenses is configured to direct the IR lights from the plurality of LEDs into the plurality of zones.

Aspect 8. The method of any of Aspects 1 to 7, wherein one or more of the plurality of zones are dynamically created by mechanically adjusting the positions of one or more of the plurality of lenses using one or more motors.

Aspect 9. The method of any of Aspects 1 to 8, wherein the recalculating AEC parameters is done sequentially.

Aspect 10. The method of any of Aspects 1 to 9, adjusting the power of each of the LEDs based on the calculated parameters is done sequentially.

Aspect 11. The method of any of Aspects 1 to 10, wherein the recalculating AEC parameters is done in parallel with other zones.

Aspect 12. The method of any of Aspects 1 to 11, wherein adjusting the power of each of the LEDs based on the calculated parameters is done in parallel with other zones.

Aspect 13. The method of any of Aspects 1 to 12, wherein the imaging system is a camera that has a first operation mode of zoom-in and a second operation mode of zoom-out.

Aspect 14. The method of any of Aspects 1 to 13, wherein adjusting the power of a first IR LED of the plurality of IR LEDs includes identifying an overlapping region between two neighboring zones; and increasing the power of each of the two neighboring zones to match the power in the overlapped region.

Aspect 15. The method of any of Aspects 1 to 14, wherein the plurality of zones is a plurality of fields of view.

Aspect 16. The method of any of Aspects 1 to 15, further includes repeating calculating auto-exposure control (AEC) parameters for the image frame to establish an average setting, and recalculating AEC parameters for a first zone the plurality of zones after a period of timeout.

Aspect 17. The method of any of Aspects 1 to 16, further includes formulating a map of reflectivity in the scene based on the power setting for each LED per region or object. For example, the scene may include a first object near an IR LED having a first reflectivity and reflecting a first level of light, which may use less power to illuminate. The scene may also include a second object having a second reflectivity, which may use moderate power to illuminate. The scene may also include a third object at the most distance from the IR LED having a third reflectivity, which may use more power to illuminate. The positions of the first, second, and third objects may be gauged based on the power setting for each LED per object.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A method for low light exposure control during night vision, the method comprising:
    actively illuminating a region by using a plurality of infrared (IR) light emitting diodes (LEDs), wherein the IR LEDs are arranged so that an IR LED of the plurality of IR LEDs covers one of a plurality of zones, and the plurality of zones combine to cover the region;
    capturing an image frame by an imaging system comprising an image sensor, wherein the image frame is made up of pixels and captured using light originating from the plurality of IR LEDs and reflected from the region onto the image sensor,
    calculating auto-exposure control (AEC) parameters for the image frame to establish an average setting;
    recalculating AEC parameters for a first zone of the plurality of zones; and
    adjusting power of a first IR LED of the plurality of IR LEDs when the AEC parameters for the first zone indicate that an image portion from the first zone is overexposed or under-exposed relative to the average setting for the image frame, the first IR LED covers the first zone.

2. The method of claim 1, wherein one of the plurality of zones overlaps with another one of the plurality of zones.

3. The method of claim 1, further comprising adjusting at least one second IR LED that illuminates at least one-second zone.

4. The method of claim 1, further comprising mounting the plurality of IR LEDs on a base to tilt the plurality of LEDs at two or more tilt angles from the base to shift one of the plurality of zones from another of the plurality of zones.

5. The method of claim 4, wherein a smaller shift results in a narrower field of view.

6. The method of claim 4, wherein a larger shift results in a broader field of view.

7. The method of claim 1, wherein the plurality of zones is created by adding a plurality of lenses in front of the plurality of LEDs that are mounted on a base without tilting, the plurality of lenses is configured to direct IR lights from the plurality of LEDs into the plurality of zones.

8. The method of claim 7, wherein one or more of the plurality of zones are dynamically created by mechanically adjusting positions of the one or more of the plurality of lenses using one or more motors.

9. The method of claim 1, wherein the recalculating AEC parameters is done sequentially.

10. The method of claim 1, wherein the adjusting the power of each of the plurality of IR LEDs based on the calculated parameters is done sequentially.

11. The method of claim 1, wherein the recalculating AEC parameters is done in parallel with other zones.

12. The method of claim 1, wherein the adjusting the power of each of the LEDs based on the calculated AEC parameters is done in parallel with other zones.

13. The method of claim 1, wherein the imaging system is a camera that has a first operation mode of zoom-in and a second operation mode of zoom-out.

14. The method of claim 1, wherein the adjusting the power of the first IR LED of the plurality of IR LEDs comprises:
    identifying an overlapping region between two neighboring zones; and
    increasing the power of each of the two neighboring zones to match the power in the overlapped region.

15. The method of claim 1, wherein the plurality of zones is a plurality of fields of view.

16. The method of claim 1, further comprising repeating the calculating auto-exposure control (AEC) parameters for the image frame to establish the average setting, and the recalculating AEC parameters for the first zone the plurality of zones after a period of timeout.

17. The method of claim 1, further comprising formulating a map of reflectivity in scene based on the power setting for each LED per region or object.

18. A non-transitory computer-readable medium comprising instructions, the instructions, when executed by a computing system, cause the computing system to:
    actively illuminate a region by using a plurality of infrared (IR) light emitting diodes (LEDs), wherein the IR LEDs are arranged so that an IR LED of the plurality of IR LEDs covers one of a plurality of zones;
    capture an image frame by an imaging system comprising an image sensor, wherein the image frame is made up of pixels and captured using light originating from the plurality of IR LEDs and reflected from the region onto the image sensor, calculate auto-exposure control (AEC) parameters for the image frame to establish an average setting;
    recalculate AEC parameters for a first zone of the plurality of zones; and
    adjust power of a first IR LED of the plurality of IR LEDs when the AEC parameters for the first zone indicate that an image portion from the first zone is overexposed or underexposed relative to the average setting for the image frame.

19. The non-transitory computer-readable medium of claim 18, wherein the non-transitory computer-readable medium further comprises instructions that, when executed by the computing system, cause the computing system to adjust at least one second IR LED that illuminates at least one-second zone or cause the computing system to mount the plurality of IR LEDs on a base to tilt the plurality of IR LEDs at two or more tilt angles from the base to shift one of the plurality of zones from another of the plurality of zones.

20. A system comprising:
    one or more processors; and
    at least one computer-readable storage medium having stored therein instructions which, when executed by the one or more processors, cause the system to:
        actively illuminate a region by using a plurality of infrared (IR) light emitting diodes (LEDs), wherein the IR LEDs are arranged so that an IR LED of the plurality of IR LEDs covers one of a plurality of zones;
        capture an image frame by an imaging system comprising an image sensor, wherein the image frame is made up of pixels and captured using light originating from the plurality of IR LEDs and reflected from the region onto the image sensor, calculate auto-exposure control (AEC) parameters for the image frame to establish an average setting;
recalculate AEC parameters for a first zone the plurality of zones; and
adjust power of a first IR LED of the plurality of IR LEDs when the AEC parameters for the first zone indicate that an image portion from the first zone is over-exposed or underexposed relative to the average setting for the image frame.

* * * * *